United States Patent [19]

Sugden

[11] Patent Number: 4,962,829
[45] Date of Patent: Oct. 16, 1990

[54] OIL MANAGEMENT TANK SYSTEM

[75] Inventor: Kenneth B. Sugden, Rockford, Ill.

[73] Assignee: Sundstrand Corporation, Rockford, Ill.

[21] Appl. No.: 324,752

[22] Filed: Mar. 17, 1989

[51] Int. Cl.$^5$ .......................................... F01M 11/08
[52] U.S. Cl. .................................. 184/6.23; 184/6.0; 184/6.21; 184/27.2; 184/65
[58] Field of Search ...................... 184/6.23, 27.2, 6.0, 184/6.21, 65

[56] References Cited

U.S. PATENT DOCUMENTS

| | | | |
|---|---|---|---|
| 2,337,449 | 12/1943 | Cattaneo | 184/6.23 |
| 2,570,134 | 10/1951 | Lancaster | 184/6.23 |
| 2,747,514 | 5/1956 | Edwards | 184/6.23 |
| 2,888,097 | 5/1959 | Scheffler | 184/6.23 |
| 3,016,977 | 1/1962 | Schweitzer | 184/6.23 |
| 4,431,372 | 2/1984 | Dadhich | 184/27.2 |
| 4,511,016 | 4/1985 | Doell | 184/6.23 |
| 4,600,413 | 7/1986 | Sugden . | |
| 4,681,189 | 7/1987 | Krisiloff | 184/6.23 |
| 4,793,440 | 12/1988 | Iseman | 184/6.23 |

*Primary Examiner*—Douglas Hart
*Attorney, Agent, or Firm*—Antonelli, Terry, Stout & Kraus

[57] ABSTRACT

An oil management system (80) for a case (12) containing at least one rotating element which requires a supply of pressurized oil during rotation in accordance with the invention includes an oil sump (16) within the case for collecting oil after lubrication of the at least one rotating element; a tank (82) within the case for containing oil during lubrication of the at least one rotating element; a first pump (32) having an inlet (90) for supplying pressurized oil to the at least one rotating element; a second pump (26) having an inlet coupled to the sump and at least one outlet (84 and 88) coupled to the first pump for providing pressurized oil to the inlet of the first pump and to an outlet (93) of the tank; the outlet from the tank being coupled to the at least one outlet of the second pump, the tank being disposed above the second pump for providing a pressure head at the at least one outlet of the tank during a non-inverted operation which opposes pressure produced by the second pump; and when oil pressure at the at least one outlet the second pump is greater than the oil pressure at the outlet of the tank, the second pump provides pressurized oil to the tank and to the inlet of the first pump and when oil pressure at the at least one outlet of the second pump is less than oil pressure at the outlet of the tank, oil from the tank flows to the at least one inlet of the first pump.

17 Claims, 3 Drawing Sheets

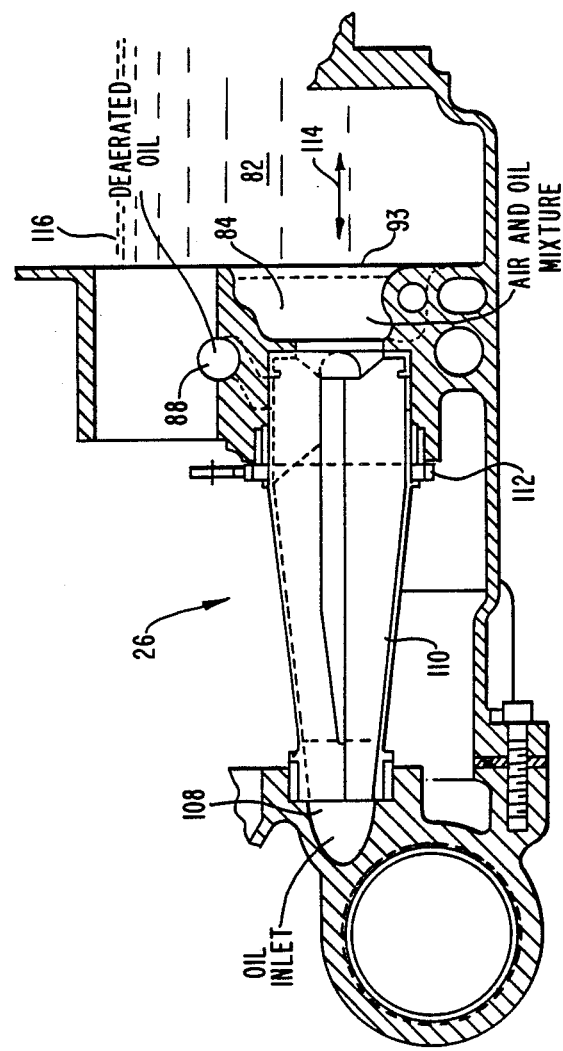

/ 1

OIL MANAGEMENT TANK SYSTEM

Cross Reference to Related Application

Reference is made to patent application Ser. No. 324,756, filed Mar. 17, 1989 pending, entitled "Oil Supply For Integrated Drive Generator" filed on even date herewith.

TECHNICAL FIELD

The present invention relates to oil supply systems for integrated drive generators used for generating constant frequency alternating current in airframes.

BACKGROUND ART

FIG. 1 illustrates a prior art oil supply system of the type utilized in integrated drive generators manufactured by the assignee of the present invention for use in the Boeing 757 and 767 aircraft. The integrated drive generator has an oil supply system 10 which controls the level of oil in the overall case 12 of the integrated drive generator by pumping oil from the case into a tank 14. It should be understood that the sump 16 has been illustrated symbolically when in fact it is in the bottom of the case 12. The purpose of the tank 14 is to hold a portion of the overall volume of oil in the case 12 while maintaining the oil level in the sump 16 below a level which would interfere with the overall operational efficiency of the rotating mechanical components of the integrated drive generator and further prevent the possibility of thermal runaway caused by substantial contact with mechanical components rotating at high rotational velocities. The tank 14 has a drain 18 in the top to permit oil to flow from the tank into the sump 16 under inverted flight or rapid descent conditions.

The oil contained in the tank 14 is controlled as follows. A scavenge pump 22 and an inversion pump 24 respectively pump oil from the sump 16 in non-inverted and inverted orientations or rapid descent conditions to a deaerator 26 through an oil circuit containing filter 28 and heat exchanger 30. Oil normally flows through the filter 28 to the heat exchanger 30, which is external to the case 12, to the inlet of deaerator 26 which supplies pressurized oil at a first output to the inlet of charge pump 32 and a mixture of oil and air at a second outlet to the sump 16. Relief valve 34 functions to open when the pressure on the output of the scavenge pump 22 exceeds a predetermined pressure. The relief valve 34 shunts oil back to the inlet of the scavenge pump 22 when the pressure at the outlet of the scavenge pump 22 exceeds the pressure limit of the relief valve to regulate the output pressure of the scavenge pump. Indicator 38 provides a visual indication to service personnel that the filter 28 is in need of service. Relief valve 40 provides a bypass of the heat exchanger 30 when the pressure drop across the heat exchanger exceeds a predetermined limit to insure a proper volume of oil flow to the inlet of the deaerator 26. During inverted operation or rapid descent conditions, oil may flow from the top 18 of tank 14 to the sump 16 to make up any deficiency of oil in the sump pumped to the charge pump 32 by the inversion pump 24. The tank 14 is fed oil from the charge pump 32 through inlet 33 during operation of the integrated drive generator 10. Drain 35 permits oil to flow from the tank 14 to sump 16 when the integrated drive generator is not operating so that the oil level in the sump rises to a level to facilitate the checking of the level by service personnel. The oil output of the charge pump 32 is connected in parallel to the rotor 48 of the three phase alternating current generator 46 to lubricate the bearings, cool the interior of the rotor by axial flow through the rotor and cool the diodes and end turns of the stator 44 which oil flows to the sump 16, to the differential 50 of a constant speed drive transmission 52 which oil flows to the sump, and to a pair of hydraulic pump and hydraulic motor combinations 56 of the constant speed drive transmission. The output oil from the pair of hydraulic pump and motor combinations is fed back to the input of charge pump 32 through charge relief valve 60 which regulates the output pressure of the charge pump.

A power takeoff 54 from the airframe propulsion engine is coupled to the hydraulic pump and motor combinations 56 and to the differential 50 in a manner conventional in an integrated drive generator. The output 57 of the hydraulic pump and motor combinations 56 is coupled to the differential 50 in the conventional manner. The constant velocity output 59 of the differential 50 is coupled to the rotor 48 of the alternating current generator 46 in the conventional manner. Governor 65 and control piston 67 are conventional controls of the hydraulic pumps.

U.S. Pat. No. 4,600,413, which is assigned to the assignee of the present invention, discloses a centrifugal deaerator and pump. The 3413 teaches that the output of the deaerator is coupled to an oil reservoir such as a housing for collecting oil. When the oil reservoir is in an inverted position, oil from the oil reservoir may flow back into the opening of the deaerator for outputting an oil air mixture through the deaerator to the deaerated oil output to the charge pump 32.

The prior art system of FIG. 1 suffers from the deficiency that it does not supply make up oil from the tank 14 to the charge pump 32 when the output from the deaerator 26 is insufficient during normal operation. With the prior art, orientations inclined from the horizontal, such as 45°, present potentially serious problems to the supply of pressurized oil to the components of the integrated drive generator requiring lubrication. When the aircraft is inclined from the horizontal, the level of oil in the sump 16, which is supplying oil to the scavenge pump 22, can be substantially changed which can prevent the scavenge pump 22 from pumping sufficient oil to the deaerator 26. At this angular orientation, the inversion pump 24 is likely to be totally ineffective in pumping oil for the reason that there is no pool of oil in proximity to the intake of the inversion pump. In an orientation inclined from the horizontal such as 45°, the coupling of the top of tank 14 through drain 18 to the sump 16 is not effective in providing oil to the intake of the scavenge pump 22 to make up for any deficiency of the oil being pumped by the scavenge pump. Because of the high rotational speeds of components in the integrated drive generator, any serious deficiency in the output of the oil pump by the charge pump 32 can lead to increased wear, loss of speed control by the hydraulic pumps and motors, or premature failure. Accordingly, the prior art of FIG. 1 does not insure that sufficient oil will be provided by the charge pump 32 to the critical components requiring pressurized oil during the operation of the integrated drive generator.

The assignee of the present application has manufactured integrated drive generators which include a dual port relief valve which functions to shunt oil from the output of the scavenge pump or inversion pump to the sump when the output pressure exceeds a pressure limit of the relief valve when the temperature of the oil is above a predetermined temperature and which functions to shunt the oil back to the input of the scavenge pump when the pressure limit is exceeded and the temperature of the oil is below the predetermined pressure for the purpose of rapidly warming the oil.

The assignee of the present invention has manufactured integrated drive generators which use oil to cool the stator of the main alternating current generator. An oil cooling circuit is contained in the back iron of the stator which receives pressurized oil from the charge pump and discharges oil into the oil sump.

The assignee of the present invention has manufactured integrated drive generators having an aspirator for removing water from oil within the integrated drive generator. The aspirator uses pressurized oil from the charge pump to draw in air from outside the case of the integrated drive generator through a duckbill valve. Oil utilized by the aspirator is discharged into the oil sump.

DISCLOSURE OF INVENTION

The present invention is an oil management system for an integrated drive generator which utilizes an oil tank disposed within the case of the integrated drive generator (1) to maintain the level of the oil in the sump within a desired operating range which achieves high operational efficiency of the rotating components and guards against thermal runaway by maintaining the tank full of oil and (2) provides a pressure head to supply any deficiency in oil outputted by a deaerator for supplying oil to the inlet of the charge pump which supplies pressurized oil to components rotating at high rotational speed within the integrated drive generator requiring critical lubrication to avoid high wear, loss of speed control by the hydraulic pumps and motors, or premature failure.

The oil level in the tank is maintained during normal operation of the integrated drive generator at a full level by the mixture of air and oil outputted by the deaerator which is pumped into the bottom of the tank, leakages from a scavenge and charge pumps, the output of the lubrication system for the rotor of an alternating current generator disposed within the case of the integrated drive generator, the output of an aspirator for removing water from oil contained within the case of the integrated drive generator, and the flow of hot oil diverted by a dual port relief valve connected to the output of the scavenge pump when the output pressure of the scavenge pump exceeds a predetermined pressure level. By pumping oil from the foregoing elements directly into the tank, the overall level of oil in the system is kept at the lowest possible level by ensuring that the tank is continually full to increase the mechanical efficiency of components rotating at high rotational velocities within the case as a consequence of lessened mechanical drag and further insuring that any deficiency in the output volume of deaerated oil from the deaerator applied to the charge pump is made up by the pressure head of the tank applied to the air and oil output of the deaerator which flows through the deaerator to the deaerated oil output of the deaerator to the inlet of the charge pump during normal inclinations of the case. The tank insures that in attitudes such as 45° from the horizontal sufficient oil will be provided to the inlet of the charge pump even when the uptake by the scavenge pump may be insufficient to in itself satisfy the volumetric requirements of the input of the charge pump.

An oil management system for a case containing at least one rotating element which requires a supply of pressurized oil during rotation in accordance with the invention includes an oil sump within the case for collecting oil after lubrication of the at least one rotating element; a tank within the case for containing oil during lubrication of the at least one rotating element; a first pump having an outlet for supplying pressurized oil to the at least one rotating element, a second pump having an inlet coupled to the sump and at least one outlet coupled to the first pump and to the tank; an outlet from the tank being coupled to the second pump, the tank being disposed above the second pump and providing a pressure head at the outlet of the tank during a non-inverted operation which opposes pressure produced by the second pump; and when oil pressure at the at least one outlet of the second pump is greater than the oil pressure at the outlet of the tank, the second pump provides pressurized oil to the tank and to the inlet of the first pump and when oil pressure at the at least one outlet of the second pump is less than oil pressure at the outlet of the tank, oil from the tank flows to the inlet of the first pump. Preferably, the first pump is a charge pump; and the second pump is a deaerator having first and second outlets, the first outlet for providing deaerated oil to the inlet of the first pump and the second outlet for providing a mixture of oil and air to the tank of the deaerator when the pressure at the second outlet exceeds the pressure head at the outlet of the tank and for receiving oil from the outlet of the tank which flows to the second outlet, through the deaerator from the first outlet to the inlet of the first pump when the pressure at the second outlet of the deaerator is less than the pressure head at the outlet of the second tank. The charge pump in pumping oil to the at least one rotating element has an oil leakage which flows into the tank through a fluid coupling mechanism. The deaerator in pumping oil to the first pump has an oil leakage which flows into the tank through a fluid conducting mechanism. Furthermore, a filter is coupled to the outlet of a scavenge pump pumping oil from the oil sump and to an inlet of the deaerator for filtering oil flowing between the oil sump and the deaerator; and a thermostatic dual port relief valve is coupled to the output of the scavenge pump, an inlet of the scavenge pump, an inlet of the filter and to the tank with the dual port relief valve being responsive to pressure at the outlet of the scavenge pump and opening in response to pressure exceeding a predetermined limit to shunt oil to the tank when the temperature of the oil flowing through the dual port relief valve is above a predetermined temperature and to shunt oil to the inlet of the scavenge pump when the temperature is below the predetermined temperature.

The at least one rotating element comprises an alternating current generator for generating multiple phase constant frequency alternating current, the generator having a rotor with an oil circuit having oil flowing axially through the rotor from the first pump to the rotor, through the rotor, and from the rotor to the tank. The alternating current generator is driven at a constant velocity in response to the variable speed input to the case by a constant speed drive transmission disposed within the case receiving pressurized oil from the first pump and discharging oil into the sump.

Furthermore, an aspirator is provided for receiving pressurized oil from the first pump for drawing in air form outside of the case for removing water from the oil within the case and discharging oil into the tank.

BRIEF DESCRIPTION OF DRAWINGS

FIG. 3 illustrates a sectional view of a deaerator joined to a tank for storing oil inside of a case of an integrated drive generator in accordance with the present invention.

BEST MODE FOR CARRYING OUT THE INVENTION

Figure 1:
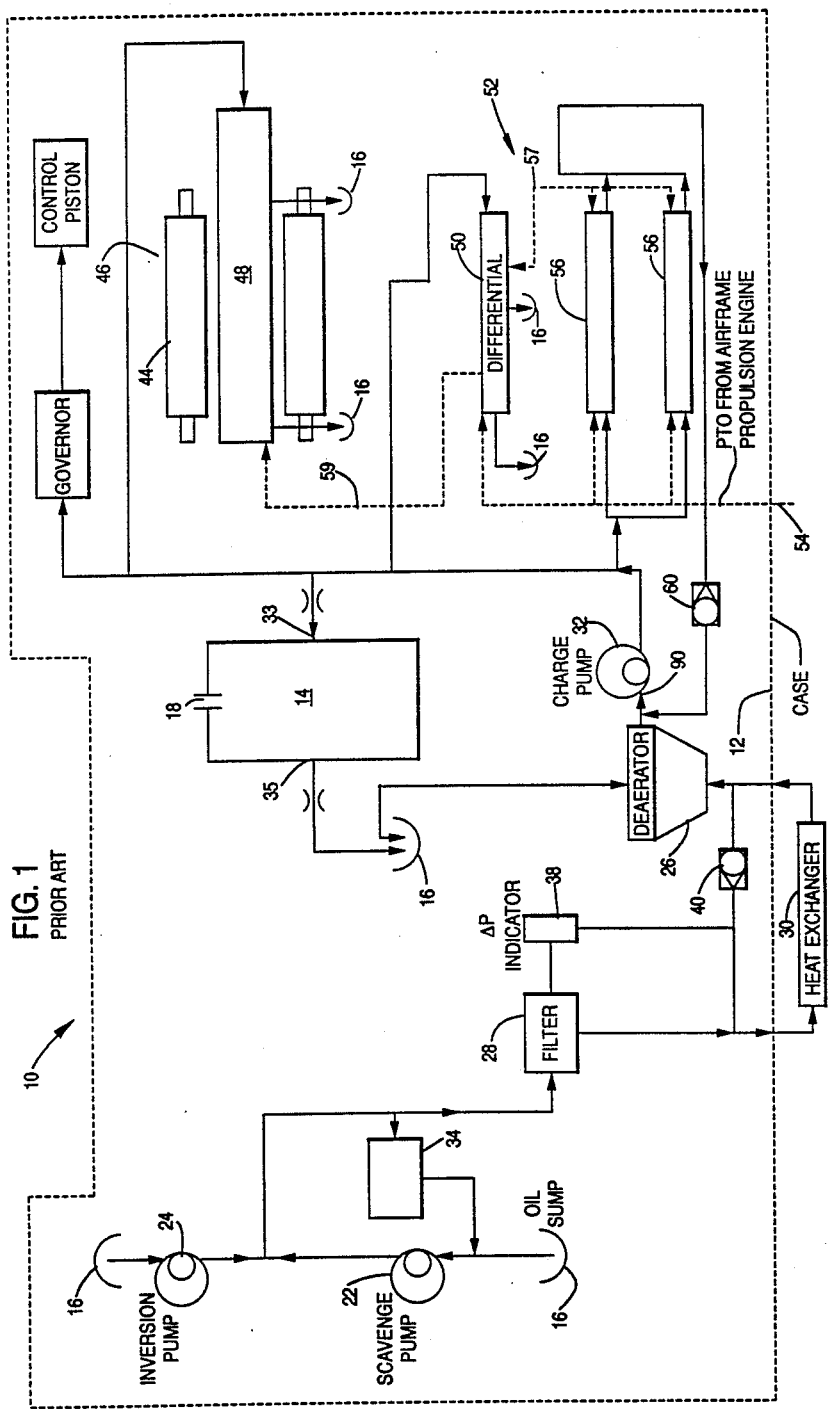
FIG. 1 illustrates a prior art oil supply system in an integrated drive generator.
Figure 2:
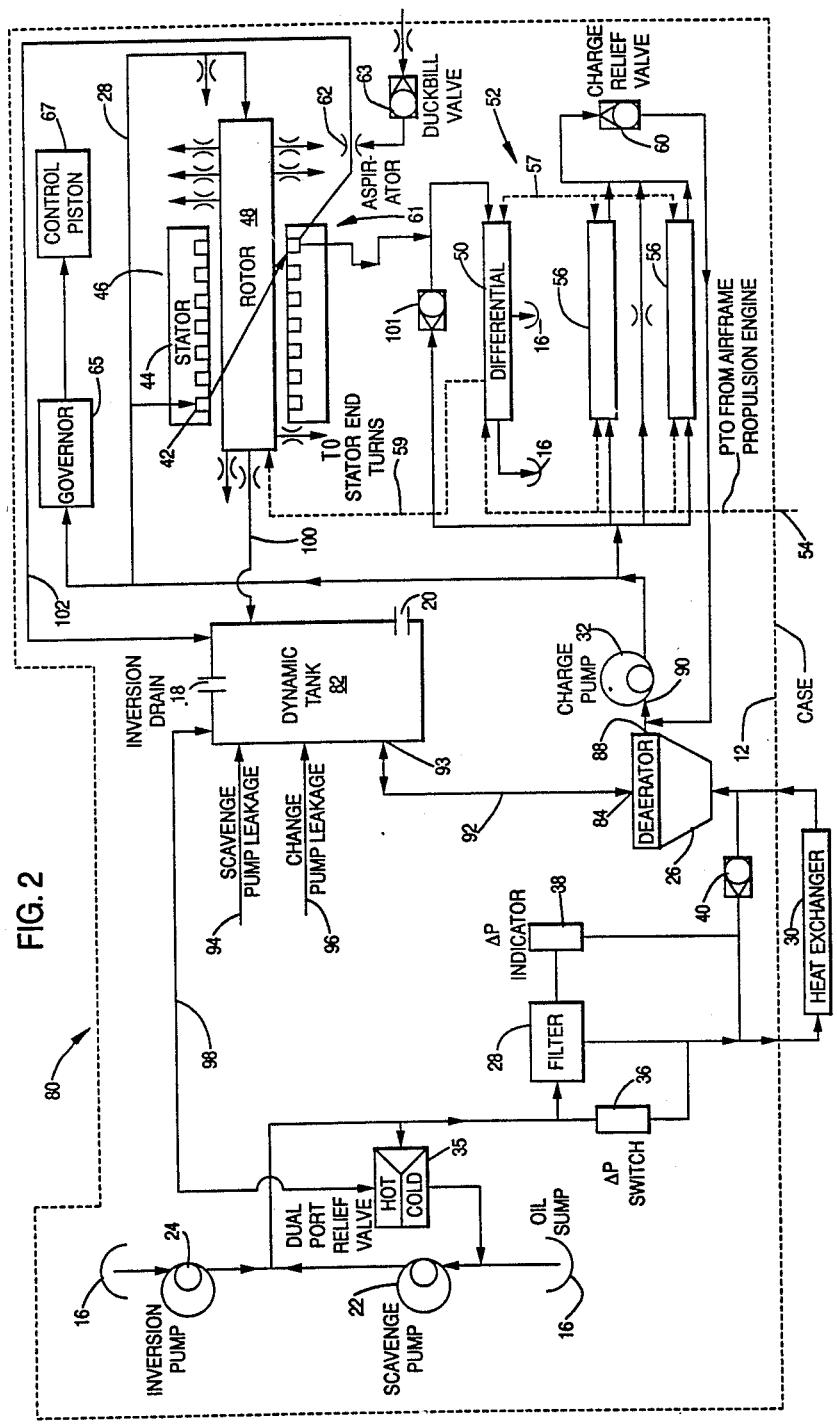
FIG. 2 illustrates a block diagram of an oil supply system for an integrated drive generator in accordance with the present invention.

FIG. 2 illustrates a block diagram of an oil supply system 80 in accordance with the present invention. Like reference numerals identify like parts in FIGS. 1 and 2. The principal differences between the present invention and the prior art of FIG. 1 pertain to the connection of various oil circuits to the tank 82. With the present invention, the tank 82 is disposed above the deaerator 26 for providing a pressure head at the outlet 93 of the tank during non-inverted operation of the integrated drive generator which opposes the pressure produced by the deaerator at a second output 84 of the deaerator. The pressure head from the tank 82 provides make-up oil during non-inverted flight including steep angles of inclination from the horizontal such as 45° which could provide severe problems in the prior art oil supply system. The make-up oil flows downward from the outlet 93 of the tank 82 to the second output 84 of the deaerator 26, through the internal structure of the deaerator 26, from the first output 88 to the input 90 of the charge pump 32. During normal operation, the tank 82 is maintained completely full of oil so that the maximum pressure head is produced.

The present invention maintains the tank 82 full of oil during normal non-inverted operation by several different oil circuits which pump oil into the tank described as follows. The first oil circuit 92 conveys mixture of oil and air, which is outputted form the second output 84 of the deaerator, at a pressure sufficient to force oil into the tank 82 at opening 93. The second oil circuit 94 is the leakage from the scavenge pump 22. Scavenge pumps in integrated drive generators are vane pumps which have substantial leakage. In accordance with the present invention, the scavenge pump may be attached directly to the wall of the tank with an opening from the bottom of the scavenge pump communicating with an opening in the tank 82 (not illustrated) which forces the leakage flow into the tank which may be in the order of a half a gallon per minute or more. The third oil circuit 96 is the leakage from the charge pump 32. Charge pumps in integrated drive generators are vane pumps which have a substantial leakage. In accordance with the invention the charge pump 32 may be directly attached to the side of the tank with an opening communicating to the tank to force the leakage flow into the tank which may be at a rate of one-half of a gallon per minute or more. The fourth oil circuit 98 connects the hot oil output from the dual port relief valve 35 to the tank 82 so that hot oil is diverted to the tank when the output pressure from the scavenge pump 22 or inversion pump 24 is above the predetermined pressure at which the dual port relief valve opens. When the oil outputted by the pumps 22 and 24 is above the predetermined pressure and below a predetermined temperature, the dual port relief valve 35 shunts the oil to the input of the scavenge pump 22 to rapidly warm the oil. In the fifth oil circuit 100, pressurized oil flows from the charge pump 32 to one end of the rotor 48, axially through the center of the rotor, and out to the other end to the tank 82. The stator 44 of alternating current generator 46 contains an oil cooling circuit 42 in the iron of the stator which receives pressurized oil from the charge pump 32. Oil flows in a series circuit 61 from the cooling circuit 42 to the differential 50 and from the differential to the sump 16. Relief valve 101 opens when the oil pressure drops in the series circuit 61 to supply pressurized oil directly from the charge pump 32 to the input of the differential to avoid damaging the differential. The sixth oil circuit 102 returns oil from aspirator 62 to the tank after the aspirator has drawn in air from outside of the case 12 through duckbill valve 63 in a known manner for purposes of removing water from oil within the case.

The six oil circuits 92-102 perform two important functions in an integrated drive generator 80 in accordance with the present invention. In the first place, the oil circuits insure that the level of oil in the sump 16 is maintained at a low level by insuring a high flow rate into the tank 82 during normal operation. The advantage of maintaining a low oil level in the sump 16 is dual fold in that high mechanical efficiency is promoted as a consequence of lessening drag of oil on elements rotating at high speed in the case. Furthermore, maintaining a low level in the tank 82 provides a larger margin for error in improperly filling the sump 16. Overfilling of the sump 16, which causes substantial contact of the oil level with the components rotating at high rotational velocities can result in a thermal runaway. Second, the oil circuits maintaining the tank 82 full during operation of the integrated drive generator assures a maximum pressure head at outlet 93 which maximizes the amount of make-up oil provided to the charge pump 32 in situations where the output of the deaerator 26 is insufficient to satisfy the flow rate to the input 90 of the charge pump necessary to maintain the oil flow required for components within the integrated drive generator which have critical oil requirements. When an airframe is in normal non-inverted flight or when in a steep bank from the horizontal during which the tank 82 is disposed above the first outlet 84 of the deaerator 26, the required flow rate of oil to the intake 90 of the charge pump 32 will occur from the oil tank 82 even if the flow into the deaerator 26 fails. With the prior art system of FIG. 1, the tank only provided oil during inverted or rapid descent flight and was not functional to provide make-up oil to the input of the charge pump 32 during non-inverted flight.

FIG. 3 illustrates a partial sectional view of a deaerator 26 as joined to tank 82. Like reference numerals identify like parts in FIGS. 2 and 3. The deaerator 26 has a plurality of vanes 110 which are rotated by a gear drive 112 to centrifugally accelerate oil to output deaerated oil at the first output 88 and to output an air and oil mixture at second output 84. The bidirectional arrow 114 signifies that flow of oil may occur from the oil inlet 108 to the first outlet 88 to produce deaerated oil and to the second outlet to produce an oil and air mixture and further that the oil 116 in the tank produces a pressure head forcing oil from the tank 82 through the opening 84 to the left and out through the output 88 when a deficiency of oil flow to the inlet occurs to supply oil to the charge pump 32.

The present invention has been illustrated schematically for the reason that the construction of the individual elements illustrated in FIG. 2 does not form part of the present invention. Practice of the invention is possible with any known structure corresponding in function to the labelled elements in FIG. 2 being usable to practice with the present invention.

While the invention has been described in terms of its preferred embodiment, it should be understood that numerous modifications may be made thereto without departing from the spirit and scope of the invention as defined in the appended claims. It is intended that all such modifications fall within the scope of the appended claims.

What is claimed:

1. An oil management system for a case containing at least one rotating element which requires a supply of pressurized oil during rotation comprising:
   an oil sump within the case for collecting the oil after lubrication of the at least one rotating element;
   a tank within the case for containing oil during lubrication of the at least one rotating element and having an outlet;
   a first means having an outlet for supplying pressurized oil to the at least one rotating element;
   a second means having an inlet coupled to the sump and at least one outlet coupled to the first means and to the outlet of the tank;
   the outlet from the tank being coupled to the second means, the tank being disposed above the second means and providing a pressure head at the outlet of the tank during a non-inverted operation which opposes the pressure produced by the second means; and
   when oil pressure at the outlet of the second means is greater than the oil pressure at the outlet of the tank, the second means provides pressurized oil to the tank and to the inlet of the first means and when oil pressure at the at least one outlet of the second means is less than oil pressure at the outlet of the tank, oil from the tank flows to the inlet of the first means.

2. An oil management system in accordance with claim 1 wherein:
   the first means is a charge pump; and
   the second means is a deaerator having a pair of outlets, the first outlet of the deaerator for providing deaerated oil to the inlet of the charge pump and a second outlet of the deaerator for providing a mixture of oil and air to the tank when the pressure at the second outlet of the deaerator exceeds the pressure head at the outlet of the tank and for receiving oil from the outlet of the tank which flows, through the deaerator from the first outlet of the deaerator, to the inlet of the charge pump when the pressure at the second outlet of the deaerator is less than the pressure of the pressure head at the outlet of the tank.

3. An oil management system in accordance with claim 2 wherein:
   the charge pump in pumping oil to the at least one rotating element has an oil leakage which flows into the tank through a fluid conducting means.

4. An oil management system in accordance with claim 2 wherein:
   the deaerator in pumping oil to the charge pump has an oil leakage which flows into to the tank through a fluid conducting means.

5. An oil management system in accordance with claim 2 further comprising:
   a filter, coupled to the outlet of a scavenge pump for pumping oil from the oil sump to the inlet of the deaerator, for filtering oil flowing between oil sump and the deaerator; and
   a thermostatic dual port relief valve coupled to the output of the scavenge pump, an inlet of the scavenge pump, an inlet of the filter and to the tank, the dual port relief valve being responsive to pressure on the outlet of the scavenge pump and opening in response to pressure exceeding a predetermined limit to shunt oil to the tank when the temperature of the oil flowing through the valve is above a predetermined temperature and to shunt oil to the inlet of the scavenge pump when the temperature is below the predetermined temperature.

6. An oil management system in accordance with claim 2 wherein:
   the at least one rotating element comprises an alternating current generator for generating multiple phase constant frequency alternating current, the generator having a rotor with an oil circuit having oil flowing axially through the rotor, and from the rotor to the tank; and
   the alternating current generator is driven at a constant velocity in response to a variable speed input to the case by a constant speed drive transmission disposed within the case receiving pressurized oil from the first pump and discharging oil into the sump.

7. An oil management system in accordance with claim 2 further comprising:
   an aspirator, receiving pressurized oil from the first pump, for drawing in air from outside the case for removing water from the oil within the case and discharging oil into the tank.

8. An oil management system in accordance with claim 1 wherein:
   the oil management system controls supply of pressurized oil to an integrated drive generator disposed within the case, the integrated drive generator comprising a multiple phase alternating current generator driven at a constant velocity by a constant speed drive transmission in response to a variable speed input to the case with the constant speed drive transmission receiving pressurized oil from the first pump and discharging oil into the oil sump.

9. An oil management system in accordance with claim 2 wherein:
   the oil management system controls supply of pressurized oil to an integrated drive generator disposed within the case, the integrated drive generator comprising a multiple phase alternating current generator driven at a constant velocity by a constant speed drive transmission in response to a variable speed input to the case with the constant speed drive transmission receiving pressurized oil from the charge pump and discharging oil into the oil sump.

10. An oil management system in accordance with claim 3 wherein:
    the oil management system controls supply of pressurized oil to an integrated drive generator disposed within the case, the integrated drive generator comprising a multiple phase alternating current generator driven at a constant velocity by a constant speed drive transmission in response to a variable speed input to the case with the constant speed drive transmission receiving pressurized oil from the charge pump and discharging oil into the oil sump.

11. An oil management system in accordance with claim 4 wherein:
the oil management system controls supply of pressurized oil to an integrated drive generator disposed within the case, the integrated drive generator comprising a multiple phase alternating current generator driven at a constant velocity by a constant speed drive transmission in response to a variable speed input to the case with the constant speed drive transmission receiving pressurized oil from the charge pump and discharging oil into the oil sump.

12. An oil management system in accordance with claim 5 wherein:
the oil management system controls supply of pressurized oil to an integrated drive generator disposed within the case, the integrated drive generator comprising a multiple phase alternating current generator driven at a constant velocity by a constant speed drive transmission in response to a variable speed input to the case with the constant speed drive transmission receiving pressurized oil from the charge pump and discharging oil into the oil sump.

13. An oil management system in accordance with claim 7 wherein:
the oil management system controls supply of pressurized oil to an integrated drive generator disposed within the case, the integrated drive generator comprising a multiple phase alternating current generator driven at a constant velocity by a constant speed drive transmission in response to a variable speed input to the case with the constant speed drive transmission receiving pressurized oil from the charge pump and discharging oil into the oil sump.

14. An oil management system in accordance with claim 3 wherein:
the deaerator in pumping oil to the first pump has an oil leakage which flows into the tank through a fluid conducting means.

15. An oil management system in accordance with claim 14 further comprising:
a filter, coupled to the outlet of a scavenge pump for pumping oil from the oil sump to the inlet of the filter, for filtering oil flowing between oil sump and the deaerator; and
a thermostatic dual port relief valve coupled to the output of the scavenge pump, an inlet of the scavenge pump, an inlet of the filter and to the tank, the dual port relief valve being responsive to pressure on the outlet of the scavenge pump and opening in response to pressure exceeding a predetermined limit to shunt oil to the tank when the temperature of the oil flowing through the valve is above a predetermined temperature and to shunt oil to the inlet of the scavenge pump when the temperature is below the predetermined temperature.

16. An oil management system in accordance with claim 15 wherein:
the at least one rotating element comprises an alternating current generator for generating multiple phase constant frequency alternating current, the generator having a rotor with an oil circuit having oil flowing axially through the rotor from the first pump to the rotor, through the rotor, and from the rotor to the tank; and
the alternating current generator is driven at a constant velocity in response to a variable speed input to the case by a constant speed drive transmission disposed within the case receiving pressurized oil from the first pump and discharging oil into the sump.

17. An oil management system in accordance with claim 16 further comprising:
an aspirator, receiving pressurized oil from the first pump, for drawing in air from outside the case for removing water from the oil within the case and discharging oil into the tank.

* * * * *